(12) United States Patent
Dayal et al.

(10) Patent No.: US 8,725,781 B2
(45) Date of Patent: May 13, 2014

(54) SENTIMENT CUBE

(75) Inventors: Umeshwar Dayal, Saratoga, CA (US);
Maria G Castellanos, Sunnyvale, CA (US); Chetan Kumar Gupta, Austin, TX (US); Song Wang, Austin, TX (US); Meichun Hsu, Los Altos Hills, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 301 days.

(21) Appl. No.: 13/017,013

(22) Filed: Jan. 30, 2011

(65) Prior Publication Data
US 2012/0197950 A1 Aug. 2, 2012

(51) Int. Cl.
*G06F 17/30* (2006.01)
(52) U.S. Cl.
USPC ........................................................ 707/822
(58) Field of Classification Search
USPC .................... 707/741, 749, 822; 703/2; 704/9
See application file for complete search history.

(56) References Cited

U.S. PATENT DOCUMENTS

| | | | |
|---|---|---|---|
| 7,130,777 B2 | 10/2006 | Garg et al. | |
| 7,720,835 B2 | 5/2010 | Ward et al. | |
| 7,792,841 B2 | 9/2010 | McAllister et al. | |
| 2010/0114899 A1 | 5/2010 | Guha et al. | |

OTHER PUBLICATIONS

Alexander Lang; Maria Mera Ortiz; Stefan Abraham; Enhancing Business Intelligence with Unstructured Data; http://subs.emis.de/LNI/Proceedings/Proceedings144/474.pdf > On pp. 469-485; Advanced Analytics Development, IBM Research and Development Germany.

*Primary Examiner* — Huawen Peng

(57) ABSTRACT

A sentiment cube system is disclosed. In one example, the system discloses a sentiment storage, including a sentiment cube data structure having a set of cells arranged by a set of dimensions. The system includes a computer programmed with executable instructions which operate a set of modules, wherein the modules comprise: a sentiment storage module which receives sentiment values associated with a set of entity features, and then populates a hierarchy of the cells in the sentiment cube with the sentiment values. A sentiment analysis module effecting a set of operations on the sentiment cube.

18 Claims, 5 Drawing Sheets

SENTIMENT CUBE

CROSS-REFERENCE TO RELATED OR CO-PENDING APPLICATIONS

This application may relate to co-pending U.S. patent application Ser. No. 12/887,965, entitled "Determining Whether A Point In A Data Stream Is An Outliner Using Hierarchical Trees," filed on Sep. 22, 2010, by Wang, et al., and U.S. patent application Ser. No. 12/889,805, entitled "Determining Correlations Between Slow Stream And Fast Stream Information," filed on Sep. 24, 2010, by Castellanos, et. al. These related applications are commonly assigned to Hewlett-Packard Development Co, of Houston, Tex.

BACKGROUND OF THE INVENTION

Brief Background Introduction

The present invention relates generally to systems and methods for sentiment analysis. Sentiment analysis is a process of managing sentiment information in a way that makes large volumes of sentiment more understandable or interpretable. There are different ways of performing sentiment analysis, yet further improvements are desired.

BRIEF DESCRIPTION OF THE DRAWINGS

Some examples of the invention are described in the following figures.

DETAILED DESCRIPTION

Sentiment analysis is increasingly becoming a key asset for companies to remain competitive in this highly dynamic economy. Many channels for expressing opinions now exist. When these opinions are relevant to a company, they are important sources of business insight, whether they represent critical intelligence about a customer's defection risk, the impact of an influential reviewer on other people's purchase decisions, or early feedback on product releases, company news or competitors. Capturing an analyzing these opinions is a necessity for proactive product planning, marketing, branding and customer service. Sentiment analysis is the process that aims to determine the attitude of a speaker or a writer with respect to some topic. Automated sentiment analysis is the process of training a computer to identify sentiment within content. Sentiment analysis can be done manually, automatically or in an hybrid way. In some systems, sentiment analysis involves extracting sentiment at a coarse level. Sentiments can be extracted by topic, for example, the sentiment for a given product model. However, a question remains, "What kind of data structure should be used and what kinds of operations can be performed to make sense of sentiments associated with various levels in a hierarchy?"

The present invention answers the preceding question, by defining a mechanism consisting of a sentiment cube data structure, and operations over this data structure. The present invention enables Business Intelligence (BI) and/or OLAP (On-Line Analytical Processing) queries to be easily formulated and executed, providing insight into perceived sentiments (previously mined from text documents) about features of different categories (or topics) from different perspectives, at different levels of granularity and including correlated features within a user-specified scope.

BI techniques such as, queries, aggregates (i.e. roll-ups) of various dimensions at selected hierarchical levels, drill down operations and special correlations, can be applied to the sentiment cube. Some example applications of BI techniques to a sentiment cube include:

- aggregating the sentiment for a particular product family;
- aggregating the sentiment from customers in a particular geography;
- correlating sentiments from multiple data sources including streaming and stored data (e.g. sentiment data from Twitter® and sentiment data from a product review site);
- trending of sentiments over time by product family;
- comparing sentiments before and after a given event such as the launch of a new product; and
- comparative analysis of sentiments for different products in different geographies.

Thus, the present invention's cube operations enable live streaming and stored data sentiments to be explored from many different dimensions and at different levels of aggregation.

Details of the present invention are now discussed.

Figure 1:
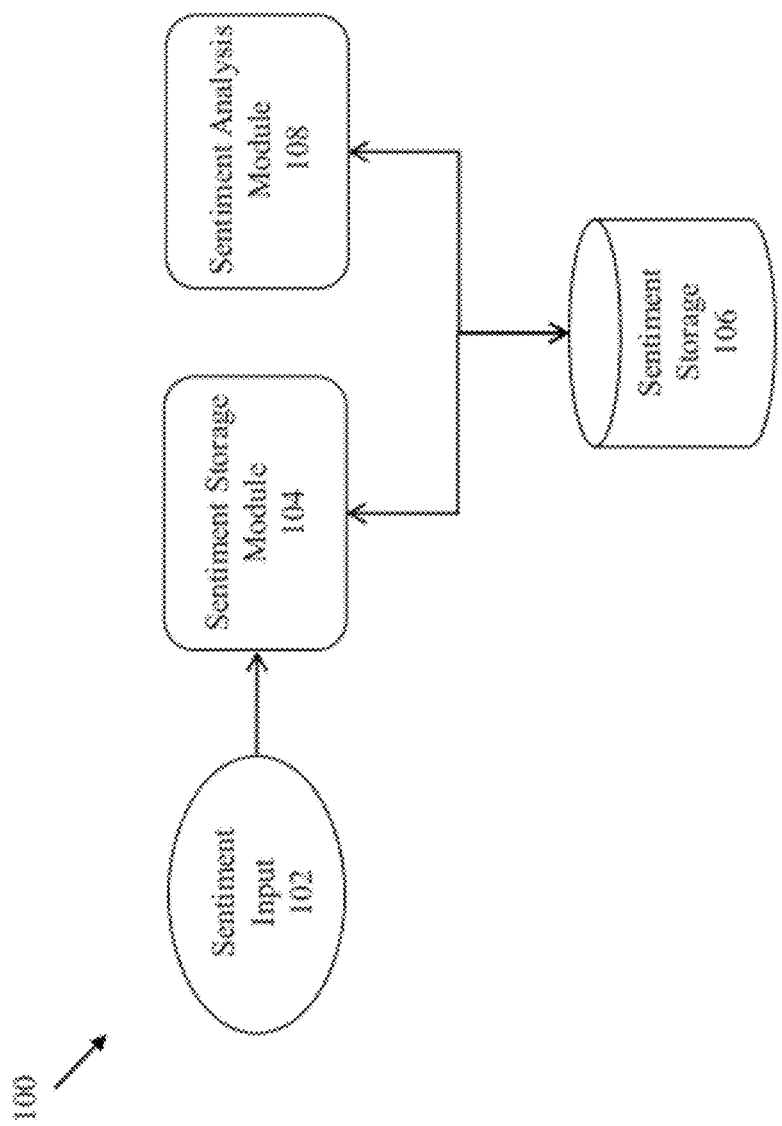
FIG. 1 is a dataflow diagram of one example of a sentiment system.
Figure 2:
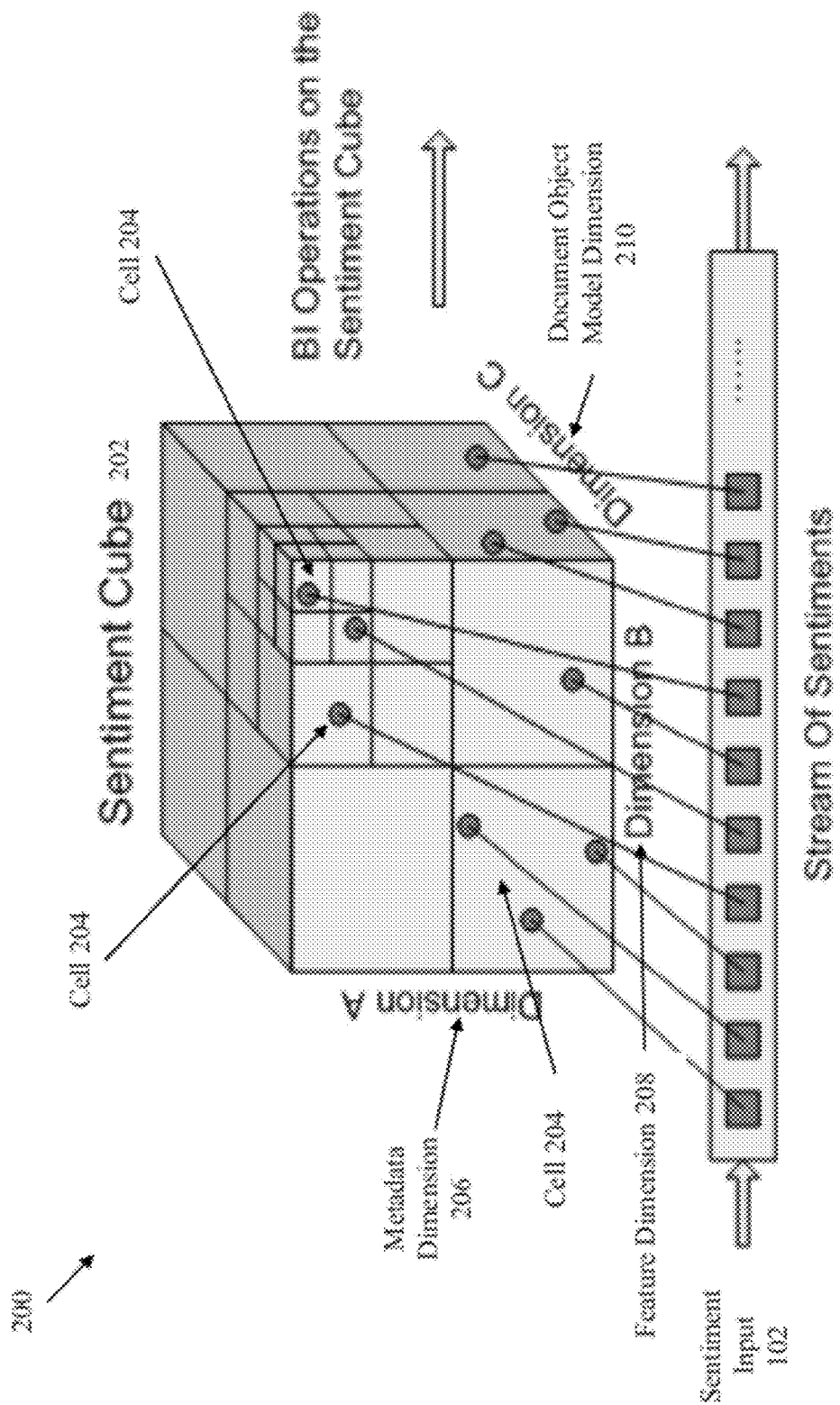
FIG. 2 is a dataflow diagram including a sentiment cube data structure used by one example of the system.
Figure 3:
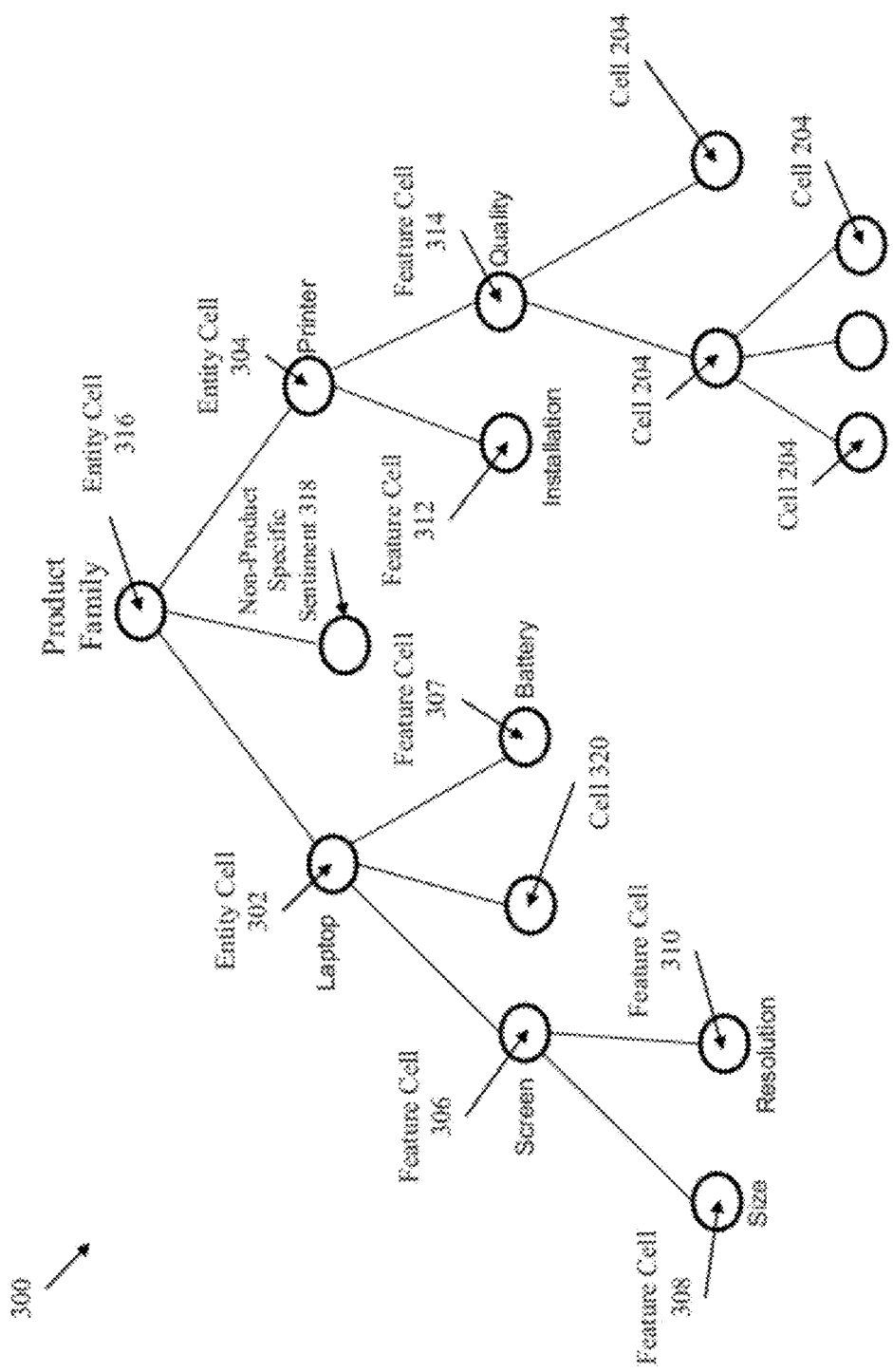
FIG. 3 is a feature hierarchy used by one example of the system.

FIG. 1 is a dataflow diagram of one example of a sentiment system 100, FIG. 2 is a dataflow diagram 200 including a sentiment cube data structure 202 used by one example of the system 100. FIG. 3 is a feature hierarchy 300 used by one example of the system 100. Due to the integrated operation of the system 100 with the sentiment cube 202 and the feature hierarchy 300, FIGS. 1 through 3 are at times discussed together to facilitate understanding of the present invention.

The system 100 receives sentiment input 102 in the form of structured data tuples. The sentiment input 102 is received from an application which applies a sentiment mining technique to a set of information sources (e.g. streaming data feeds, stored data, text documents, etc.) expressing sentiments about features of a set of entities.

An "entity" can be anything, any topic, etc. about which sentiment is expressed. For example as shown in the feature hierarchy 300 of FIG. 3, entity cell 302 is associated with a "laptop computer", and entity cell 304 is associated with a "given printer model". A "feature" is a specific aspect (i.e. sub-set) of an entity 302, 304 about which a sentiment is expressed. The feature hierarchy 300 of FIG. 3, shows a "screen" associated with feature cell 306, a "size" associated with feature cell 308, and a "resolution" associated with feature cell 310 for the "laptop" entity 302. The feature hierarchy 300 of FIG. 3, also shows an "installation" associated with feature cell 312, and a "quality" associated with feature cell 314 for the "printer" entity 304. The "printer" entity 304 may in some embodiments also include features such as: ease of use, size, cartridge, ink, and color.

A sentiment storage module 104 receives and stores the sentiment input 102 into a sentiment cube 202 data structure in the sentiment storage 106. An example sentiment cube 202 data structure is shown in FIG. 2. The sentiment cube 202, depicted is a particular kind of data cube data structure over which a set of operations, specifically designed to facilitate the analysis of sentiment, are performed. While the data structure 202 is described as a "cube", in other example embodiments, the data structure 202 can be an N-dimensional data structure, where N is any integer.

The sentiment cube 202 can be populated with sentiment input 102 in a variety of ways. In one example embodiment, the sentiment input 102 includes a stream of sentiment values flowing into the sentiment cube 202. Such data streams can be fast or slow and can be either real-time sentiment data or retrieved from a memory store, such as the sentiment storage 106. These sentiment values are then inserted into one or more cells 204 (as shown in the sentiment cube 202 of FIG. 2, as well as in the feature hierarchy of FIG. 3).

The sentiment cube 202 itself is a data structure consisting of a set of dimensions 206, 208, 210 and corresponding set of sentiment values (a.k.a. "measures") obtained from the sentiment input 102. These dimensions 206, 208, 210 often have associated hierarchies.

A metadata dimension 206 is associated with the information sources (e.g. text documents) from which the sentiment input 102 is obtained. Some example metadata includes: author, time, location, user rating, and product. Some hierarchies associated with the metadata dimension 206 includes: a time hierarchy consisting of years, quarters, months, weeks, days, hours; and a location hierarchy consisting of regions, states, counties, and cities. FIG. 2 shows an example metadata dimension 206.

A feature dimension 208 is derived those features associated with an entity (e.g. a product, service, etc). A feature (e.g. see FIG. 3 feature cells 306, 308, 310, 312, 314) is a specific aspect of an entity 302, 304 about which a sentiment value is expressed and Obtained. For example, with respect to a given printer model (e.g. associated with entity cell 304), the features could be quality (e.g. feature 314), ease of use, installation (e.g. feature 312), size, cartridge, ink, color, and so on. FIG. 2 shows an example feature dimension 208.

One or more feature hierarchies (e.g. the feature hierarchy associated with the "laptop" entity 302, and the feature hierarchy associated with the "printer" entity 304) can be conceptually grouped under one single feature hierarchy (e.g. there is a common root node feature hierarchy associated with the "product family" entity 302). Thus sentiment analysis of the product family entity 316 can be performed, regardless whether the sentiment values come from one of the sub-products 302, 304 or from non-product specific sentiment 318.

The sentiment values for the feature dimension are typically mined from the information sources (e.g. text documents) which yielded the sentiment input 102. The feature dimension 208 is, in one example embodiment, not the same as the metadata dimension 206 in the sense that the sentiment cube 202 cells 204 can refer to high level features, not just leaf features. For example, all cells 204 for the "screen" feature 306 can be aggregated to the "laptop" entity cell 302, but there may also be one or more cells (e.g. cell 320) that provide sentiment directly applicable to the "laptops" entity 302 but not to any child feature 306, 308, 310 of the "laptop".

A Document Object Model (DOM) dimension 210 is derived from the "architecture" of the information sources (e.g. text documents) from which the sentiment input 102 is obtained. For example, if the information source is a text document, then the text document's architecture would perhaps include: sections, chapters, paragraphs, sentences, clauses, phrases, etc. A root node in the sentiment cube 202 and associated feature hierarchy 300 could be an entire set of documents from which sentiment input 102 is obtained. FIG. 2 shows an example DOM dimension 210.

The sentiment values in the sentiment input 102 populate the cells 204, 302-320 in the sentiment cube 202 and the feature hierarchy 300. There are preferably a set of sentiment values associated with every feature 306-314. In one example embodiment, a sentiment value can be selected from a finite set of values (e.g. positive, negative or neutral; or +1, −1, 0). In another example embodiment, a sentiment value can be selected from a continuous set of values (e.g. a rational number score).

In one embodiment of the present invention, the sentiment cube 202 data structure is modeled as follows:

<doc_id,{DOM_dimension},{metadata_dimension},feature_dimension, feature_sentiment value>

Wherein, the number of cuboids in the cube is same as a traditional data cube, which is equal to:

$$\prod_{i=1}^{d}(L_i+1),$$

where $L_i$ is the number of levels in a hierarchy for dimension i, and d is the number of dimensions in the cube.

A sentiment analysis module 108 accesses the sentiment cube 202 and associated sentiment values from the sentiment storage 106. The sentiment analysis module 108 then effects a set of operations (e.g. aggregation operations; Business Intelligence (BI) operations; etc.) on the sentiment cube 202 to facilitate the exploration or analysis of the sentiment values. The operations can be performed along the different dimensions 206, 208, 210 of the sentiment cube 202.

The operations can also be performed at or between specifically selected levels in the feature hierarchy 300.

Some types of operations that can be performed on the sentiment cube 202 data structure are herein defined as cube operations and non-cube operations.

Cube operations are Business Intelligence (BI) and/or OLAP (On-Line Analytical Processing) operations of roll-up, drill-down, and slice and dice.

Roll-up is an operation of aggregating sentiment values into a parent node (e.g. the "laptop" entity cell 302 in FIG. 3) in a hierarchy (e.g. the feature hierarchy 300). For example, a query may request aggregation of measured sentiment values for the quality of printers in Europe. To effect this a roll-up on location, document, and feature dimensions is performed on the sentiment cube 202.

A different type of roll-up is now presented, involving rolling-up a specifically selected set of hierarchical cells 204 (a.k.a. entities, features, or levels) within one or more of the dimensions 206, 208, 210. A key difference, between this roll-up and a traditional roll-up, is that the specifically selected cells over which the roll-up aggregation is performed can be hierarchically disconnected. For example, the feature hierarchy 300 in FIG. 3 shows an entity cell 302 (i.e. "laptop") into which sentiment values from feature cell 310 (i.e. "resolution") can be aggregated, without including the sentiment values from feature cell 306 "screen"). Thus, entity cell 302 i.e. "laptop") is hierarchically disconnected from feature cell 310 (i.e. "resolution"), yet a roll-up which aggregates the sentiment values from these two cells 302, 310 can still be performed, even though cell 306 is not included in the roll-up.

Three types of roll-up aggregation operations are now described.

A first type is "roll-up on the metadata dimensions 206" (wherein the aggregation function is herein defined as $f_{META}$). For example, roll-up by date, by week, by month, etc.

A second type is "roll-up on the feature dimension 208" (wherein the aggregation function is herein defined as $f_{FEATURE}$). Here the sentiment values can be associated with one or more specifically selected nodes (i.e. features, aspects, cells, etc.). This means that sentiment values can be rolled-up on any node in the hierarchy, which is useful since customers can write reviews on any feature of a product.

For example, with reference to the hierarchy in FIG. 3, there can be sentiments associated with the screen of a laptop, or the size of the laptop screen, or the laptop itself (e.g. "the laptop is very nice", "the quality is good", "the size of the screen is too small", "the screen is awesome", etc.). Depending upon the nodes specifically selected for the roll-up on the feature dimension 208 a leaf node in the feature hierarchy 300 may or may not be included.

A third type is "roll-up on the DOM dimension 210" (wherein the aggregation function is herein defined as $f_{DOM}$). Here the aggregation function $f_{DOM}$ may be user defined because the sentiment values are aggregated over a larger portion of the information sources from which the sentiment input 102 is obtained.

For example, if the information source is a text document, the sentiment values may be aggregated over a larger portions of the text document (e.g. over paragraphs instead of over only sentences). In such cases aggregate sentiment regarding a feature should not be computed by just averaging and summing up a total number of sentiment values in the text document. Instead, the aggregation function may need to take into account a number of words, a number of sentences, use weights, or other elements of the document. This is because the sentiment values that are aggregated are not independent of each other.

A roll-up aggregation function on the sentiment cube is specified as follows:

Roll-up (sentiment_cube, [{dimension}, {abbregation function}])

where:
a. sentiment_cube: specifies the sentiment cube 202 on which the roll-up will be done;
b. dimension: specifies one or more dimensions 206, 208, 210 on which sentiment aggregation will be done, and up to which levels in the corresponding feature hierarchy; and
c. aggregation function: specifies the aggregation function to use to do the aggregation, it can be any subset of $f_{DOM}$, $f_{META}$, $f_{FEATURE}$ depending on which dimension(s) the roll-up is done. For example, if the dimension is a meta-data dimension 206 (e.g., roll-up by week), $f_{META}$ could be the average, or if the dimension is on the document object model dimension 210 and feature dimensions (e.g., roll-up by document and by feature two levels up), $f_{DOM}$ could be a function that considers the frequency of a feature word to weight its sentiment and $f_{FEATURE}$ could be the average.

Drill Down and Slice & Dice are operations for exploring sentiment values at finer levels of granularity. If the sentiment cube 202 is "materialized" than certain operations can be performed by table look up.

Non-cube operations are another set of operations that can be performed on the sentiment cube 202 data structure.

Joins are performed by combining data from two or more relational database tables into one table, based upon a common attribute (e.g. equality operator). For example, a "laptop" field in a first "data table/region" is equivalent to a "laptop" field in a second "data table/region".

The present invention defines a set of "equality operators" (see below) which can be applied to the sentiment cube 202 to create new "aggregation and join operations". These new types of aggregates and joins allow for retrieval of sentiment values for specifically selected (e.g. related) features from the feature hierarchy 300. These operations can specify a set of boundaries within the feature hierarchy 300 where matches/equalities can be found. Such boundaries can specify not only up to which level in the feature hierarchy, hut also how far up or down from any selected lode (i.e. entity, feature, cell).

These "equality operators" enable different things to be aggregated or joined. For example, instead of just rolling-up all sentiment on the "laptop" (e.g. entity cell 302) just by itself, or everything in the laptop hierarchy, these new operations permit selectively rolling-up specific features/aspects of the laptop independent of other features in the laptop" (e.g. rolling-up and combining sentiment values for the "laptop" entity cell 302, 320 with just the laptop's "screen" cells 306, 308, 310, and disregarding the sentiment values for the "laptop's "battery" feature cell 307. These "equality operators" are useful for finding features whose sentiments are correlated with each other.

A first equality operator is symbolized as:

$$\stackrel{k}{\equiv} p$$

The first equality operator defines an upward path equality. The first equality operator means that feature-X (e.g. "laptop") is considered to be equal to feature-Y (e.g. "battery"), if feature-X is at-most the $k^{th}$ hierarchical ancestor of feature-Y.

A second equality operator is symbolized as:

$$\stackrel{k}{\equiv} s$$

The second equality operator defines an upward subs-tree equality. The second equality operator means that feature-X is considered to be equal to feature-Y, if feature-X exists in a sub-tree rooted at the $k^{th}$ hierarchical ancestor of feature-Y.

A third equality operator is symbolized as:

$$\equiv_k^p$$

The third equality operator defines a downward path equality. It means that feature-X is considered to be equal to feature-Y, if feature-Y is one of the $k^{th}$ hierarchical descendents of feature-X.

A fourth equality operator is symbolized as $$\equiv_k^s$$

The fourth equality operator defines a downward sub-tree equality. It means that feature-X is considered to be equal to feature-Y, if feature-Y is contained in a sub tree rooted at one of the $k^{th}$ hierarchical descendents of feature-X.

The new types of aggregates and joins described above apply when dealing with one feature dimension 208. Several feature dimensions 208 can be combined in one example using the following equation:

$$d_H(t1, t2) < \text{threshold}$$

where t1, t2 are the sentiments, and $d_H$ is a hierarchical distance function that is fixed by the user along with the threshold.

These new types of aggregates and joins can, in one example embodiment, be implemented by using an auxiliary data structure called HNT (Hierarchical Neighborhood Trees). A self-join query can be performed on a same stream of data or on a same table. Alternatively, a similarity join between a table (extracted from the stored reviews) and information extracted from a stream of reviews (such as from Twitter or some on-line source) can be performed.

In one example, the sentiment cube 202 can be embodied in a database as follows. The sentiment cube 202 is represented by a fact table and a set of dimension tables.

The fact table contains the sentiment values for the features extracted and the metadata (or standard dimensions that come with each document). An example fact table can be defined as follows:

---
Document (doc_id, sentence_id, {feature, sentiment_value}, {metadata_attribute})
---

The feature dimension 208 table can be defined as follows:
Feature_A (feature, parent_feature, child_feature)
The DOM dimension 210 table, which can contain additional structure such as paragraphs, sections, can be defined as follows:

---
Doc-sentence (doc_id, sentence_id, sentence_startPosition, sentence_endPosition)
---

Some "Example Database Queries" using the new types of non-data cube aggregate and join operators are now presented.

An example query to find "similar" reviews with the same sentiment polarity is:

---
SELECT t1.* FROM table1 t1, stream1 s1
    WHERE $d_H$ (t1.*, s1.*) < threshold AND t1.hotelID = s1.hotelID
AND t1.score * s1.score>0
---

An example query to determine whether the product reviewer a picky/nice guy is:

---
SELECT t2.reviewerID, f(t2.score_featureA, t2.score_featureB, ... )
FROM {SELECT t1.* FROM table1 t1, stream1 s1

WHERE t1.featureA $\overset{k}{\equiv}$ p s1.featureA AND < t1.featureB $\overset{k}{\equiv}$ p s1.featureB
AND ... AND t1.hotelID = s1.hotelID}
    GROUP BY t2.reviewerID;
---

An example query to determine whether a hotel's "bed changing" is better/worse is:

---
SELECT wID, AVG(s1.score) FROM stream1 s1 [window1]
WHERE $d_H$(s1.feature,'bed') < threshold AND s1.hotelID = 'hotel1'
---

Figure 4:
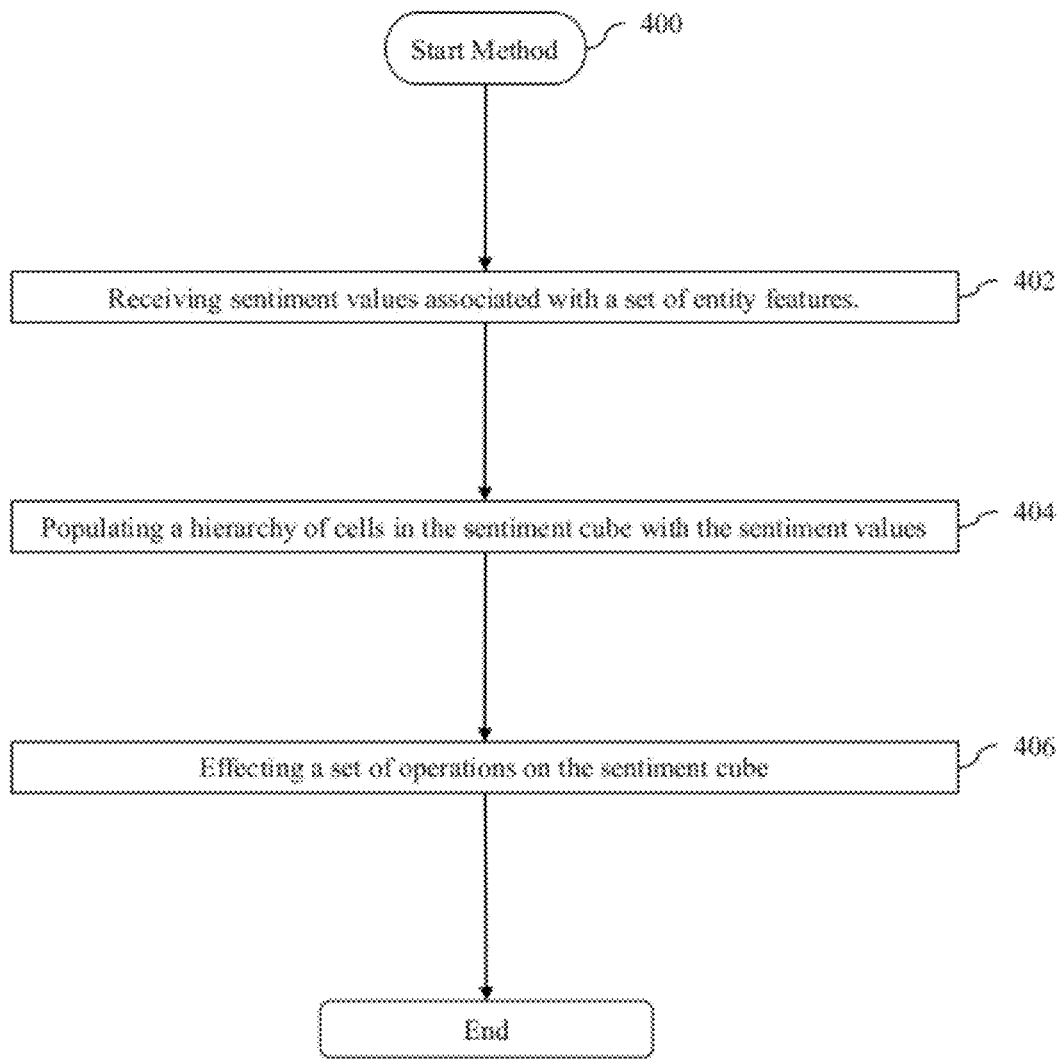
FIG. 4 is a flowchart of one example of a sentiment method.

FIG. 4 is flowchart of one example of a sentiment method 400. The blocks comprising the flowchart can be effected in any order, unless a specific order is explicitly stated. Also, those skilled in the art will recognize that while one example of the present invention's method is now discussed, the material in this specification can be combined in a variety of ways to yield other examples as well. The method next discussed is to be understood within a context provided by this and other portions of this detailed description.

The method 400 begins in block 402, by receiving sentiment values associated with a set of entity features. Next, in block 404, a hierarchy of cells in the sentiment cube are populated with the sentiment values. In block 406, a set of operations are effected on the sentiment cube, thereby providing insight into sentiments (previously mined from text documents) about features of different entities from different perspectives, at different levels of granularity and including correlated features within a user-specified scope.

Figure 5:
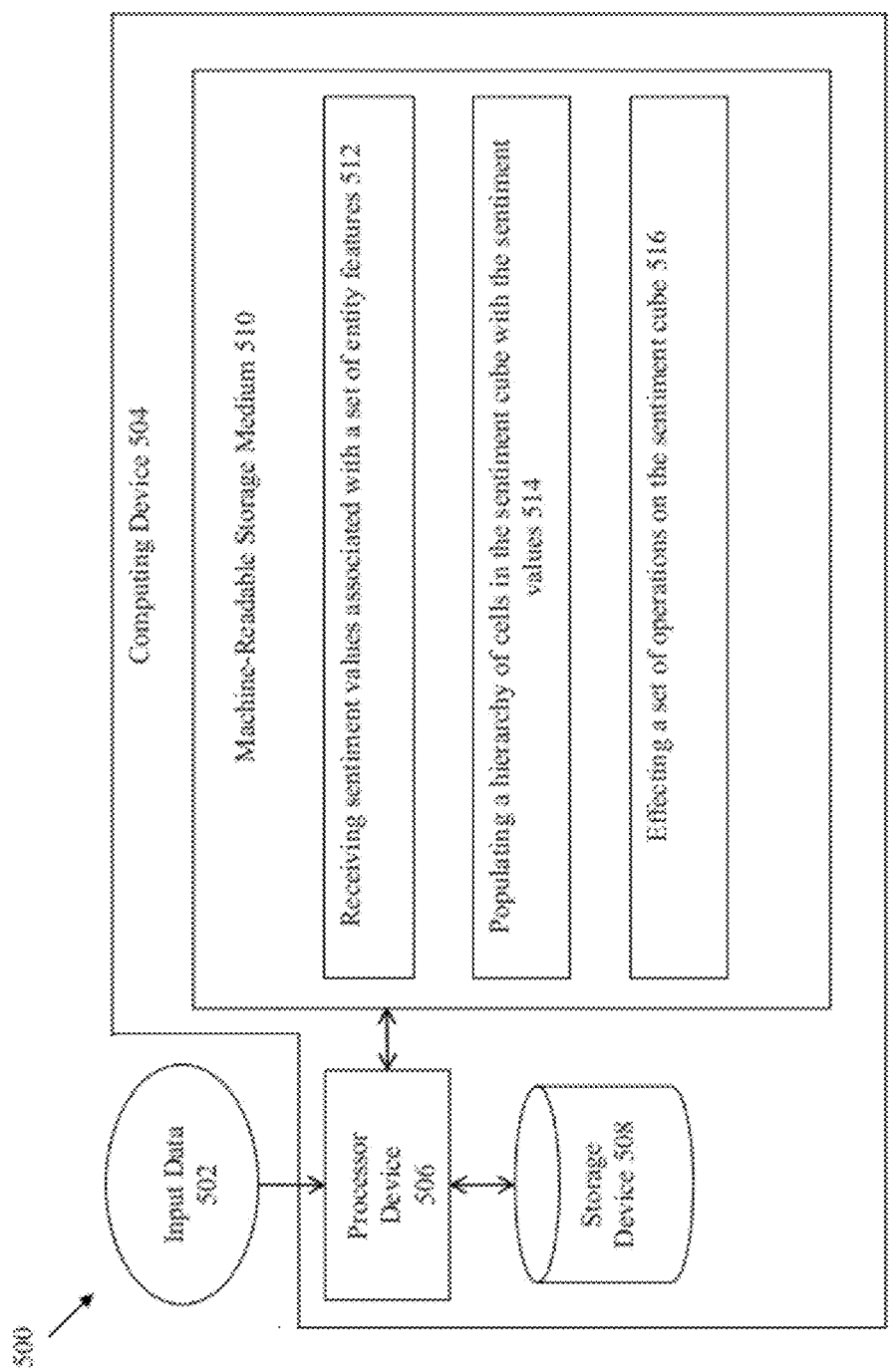
FIG. 5 is another example of the sentiment system.

FIG. 5 is another example 500 of the sentiment system 100. The example 500 shows input data 502 being received by a computing device 504. The computing device 504 includes a processor 506, a storage device 508, and a machine-readable storage medium 510. Instructions within the machine-readable storage medium 510 control how the processor 506 interprets and transforms the input data 502, using data within the storage device 508.

The instructions stored in the machine-readable storage medium 510 include: block 512, for receiving sentiment values associated with a set of entity features; wherein an entity is one from a group including: a product, a service, and a subject; and wherein a feature is a sub-set of the entity; block 514, for populating a hierarchy of cells in the sentiment cube with the sentiment values; and block 516 for effecting a set of operations on the sentiment cube.

The processor (such as a central processing unit, CPU, microprocessor, application-specific integrated circuit (ASIC), etc.) controls the overall operation of the storage device (such as random access memory (RAM) for temporary data storage, read only memory (ROW for permanent data storage, firmware, flash memory, external and internal hard-disk drives, and the like). The processor device communicates with the storage device and machine-readable storage medium using a bus and performs operations and tasks that implement one or more blocks stored in the machine-readable storage medium.

As used herein and in the claims, these words are further defined as follows:

The term "file" or "a set of files" refers to any collection of files, such as a directory of files. A "file" can refer to any data object (e.g., a document, a bitmap, an image, an audio clip, a video clip, software source code, software executable code, etc.). A "file" can also refer to a directory (a structure that contains other files).

Function and software instructions described above are typically embodied as a set of executable instructions which are effected on a computer which is programmed with and controlled by said executable instructions. Such instructions are loaded for execution on a processor (such as one or more CPUs). The processor includes microprocessors, microcontrollers, processor modules or subsystems (including one or more microprocessors or microcontrollers), or other control or computing devices. A "processor" can refer to a single component or to plural components.

In one example, one or more blocks or steps discussed herein are automated. In other words, apparatus, systems, and methods occur automatically. The terms "automated" or "automatically" (and like variations thereof) mean controlled operation of an apparatus, system, and/or process using computers and/or mechanical/electrical devices without the necessity of human intervention, observation, effort and/or decision.

In some examples, the methods illustrated herein and data and instructions associated therewith are stored in respective storage devices, which are implemented as one or more computer-readable or computer-usable storage media or mediums. The storage media include different forms of memory including semiconductor memory devices such as DRAM, or SRAM, Erasable and Programmable Read-Only Memories (EPROMs), Electrically Erasable and Programmable Read-Only Memories (EEPROMs) and flash memories; magnetic disks such as fixed, floppy and removable disks; other magnetic media including tape; and optical media such as Compact Disks (CDs) or Digital Versatile Disks (DVDs). Note that the instructions of the software discussed above can be provided on one computer-readable or computer-usable storage medium, or alternatively, can be provided on multiple computer-readable or computer-usable storage media distributed in a large system having possibly plural nodes. Such computer-readable or computer-usable storage medium or media is (are) considered to be part of an article (or article of manufacture). An article or article of manufacture can refer to any manufactured single component or multiple components.

In the foregoing description, numerous details are set forth to provide an understanding of the present invention. However, it will be understood by those skilled in the art that the present invention may be practiced without these details. While the invention has been disclosed with respect to a limited number of examples, those skilled in the art will appreciate numerous modifications and variations thereof. It is intended that the following claims cover such modifications and variations as fall within the true spirit and scope of the invention,

What is claimed is:

1. A sentiment cube system, comprising:
a sentiment storage, including a sentiment cube data structure having a set of cells arranged by a set of hierarchical dimensions, wherein the set of hierarchical dimensions include a metadata dimension including metadata associated with an information source, a feature dimension including entity features about which sentiment is expressed, and a Document Object Model (DOM) dimension including an information source hierarchy; and
a computer programmed with executable instructions including a processor to operate a set of modules, wherein the modules comprise:
a sentiment storage module for:
receiving sentiment values associated with a set of entity features; and
populating a hierarchy of the cells in the sentiment cube with the sentiment values; and
a sentiment analysis module for effecting a set of operations on the sentiment cube.

2. The system of claim 1:
wherein the cells are arranged into an N-dimensional data structure, where N is any integer equal to or greater than 3.

3. The system of claim 1:
wherein the entity is one from a group including: a product, a service, and a subject; and
wherein the feature is a sub-set of the entity.

4. The system of claim 1:
wherein the metadata dimension is defined by metadata associated with information sources from which the sentiment values are derived.

5. The system of claim 1:
wherein the feature dimension is derived from the entity features.

6. The system of claim 1:
wherein the DOM dimension is derived from an information source hierarchy from which the sentiment values are derived.

7. The system of claim 6:
wherein the information source is a text document and the DOM dimension is defined as at least one from a group including: a section, a chapter, a paragraph, a sentence, a clause, and a phrase.

8. The system of claim 1:
wherein the sentiment cube data structure is modeled as:

<doc_id,{DOM_dimension},{metadata_dimension},feature_dimension, feature_sentiment value>

9. The system of claim 1:
wherein the sentiment cube implemented in a database includes:
a fact table defined as:

Document (doc_id, sentence_id, {feature, sentiment_value}, {metadata_attribute}); and a set of dimension tables defined as:
Feature_A (feature, parent_feature, child_feature); and
Doc-sentence (doc_id, sentence_id, sentence_startPosition, sentence_endPosition).

10. A system, comprising:
a sentiment storage, including a sentiment cube data structure having a set of cells populated with sentiment values and arranged by a set of hierarchical dimensions, wherein the set of hierarchal dimensions include a metadata dimension including metadata associated with an information source, a feature dimension including entity features about which sentiment is expressed, and a Document Object Model (DOM) dimension including an information source hierarchy; and
a computer programmed with executable instructions including a processor to operate a set of modules comprising:
a sentiment analysis module for effecting a set of operations on the sentiment cube which access and aggregate sentiment values.

11. The system of claim 10:
wherein the sentiment analysis module selects a set of hierarchically disconnected cells; and
wherein the operations include a roll-up operation which aggregates sentiment values from the hierarchically disconnected cells according to a user defined aggregation function.

12. The system of claim 10:
wherein the operations perform a roll-up aggregation along the set of hierarchical dimensions.

13. The system of claim 10:
wherein a roll-up aggregation on the sentiment cube is defined as: Roll-up (sentiment_cube,[{dimension}, {aggregation function}])

wherein:
- sentiment_cube: specifies the sentiment cube on which the roll-up is performed;
- dimension: specifies one or more dimensions on which sentiment value aggregation is performed, and up to which levels in a corresponding feature hierarchy; and
- aggregation function: specifies an aggregation function for the roll-up.

14. An article comprising at least one computer-readable storage medium storing instructions that upon execution cause a computer system to:
- arrange cells in a sentiment cube in a feature hierarchy;
- populate the cells with sentiment values; and
- correlate sentiment values from a first cell and a second cell in the sentiment cube based upon an equality operator from a fixed set of equality operators, and
- arrange the cells by a set of hierarchical dimensions, wherein the set of hierarchical dimensions include a metadata dimension including metadata associated with an information source, a feature dimension including entity features about which sentiment is expressed, and a Document Object Model (DOM) dimension including an information source hierarchy.

15. The instructions of claim 14:
wherein the fixed set of equality operators includes an equality operator that permits the sentiment value in the first cell to be correlated with the sentiment value in the second cell if the second cell is at-most a $k^{th}$ hierarchical ancestor of the first cell, where k is an integer.

16. The instructions of claim 14:
wherein the fixed set of equality operators includes an equality operator that permits the sentiment value in the first cell to be correlated with the sentiment value in the second cell if the second cell exists in a sub-tree rooted at a $k^{th}$ hierarchical ancestor of first cell, where k is an integer.

17. The instructions of claim 14:
wherein the fixed set of equality operators includes an equality operator that permits the sentiment value in the first cell to be correlated with the sentiment value in the second cell if the second cell is one of a $k^{th}$ hierarchical descendents of the first cell, where k is an integer.

18. The instructions of claim 14:
wherein the fixed set of equality operators includes an equality operator that permits the sentiment value in the first cell to be correlated with the sentiment value in the second cell if the second cell is contained in a sub-tree rooted at one of a $k^{th}$ hierarchical descendents of the first cell, where k is an integer.

* * * * *